United States Patent [19]
Miyazoe et al.

[11] Patent Number: 5,944,056
[45] Date of Patent: Aug. 31, 1999

[54] PIPE JOINT FOR FLUID PRESSURE APPARATUS

[75] Inventors: Shinji Miyazoe; Bunya Hayashi; Makoto Ishikawa, all of Ibaraki, Japan

[73] Assignee: SMC Corporation, Tokyo, Japan

[21] Appl. No.: 09/116,341

[22] Filed: Jul. 16, 1998

[30] Foreign Application Priority Data

Aug. 11, 1997 [JP] Japan .................................. 9-228872

[51] Int. Cl.⁶ .................................................. F16L 37/00
[52] U.S. Cl. ................... 137/625.64; 137/798; 137/884; 285/12; 285/26
[58] Field of Search .............................. 137/625.64, 798, 137/884; 285/12, 26, 29, 906

[56] References Cited

U.S. PATENT DOCUMENTS

| | | | |
|---|---|---|---|
| 5,333,647 | 8/1994 | Fukano et al. ........................ | 137/884 |
| 5,459,953 | 10/1995 | Fukano et al. ....................... | 137/884 X |
| 5,462,087 | 10/1995 | Fukano et al. ........................ | 137/884 |
| 5,529,088 | 6/1996 | Asou ..................................... | 137/271 X |
| 5,586,570 | 12/1996 | Fukano et al. ....................... | 137/884 X |
| 5,699,834 | 12/1997 | Hayashi et al. ...................... | 137/884 |
| 5,725,255 | 3/1998 | Hayashi et al. ...................... | 285/26 |

*Primary Examiner*—Gerald A. Michalsky
*Attorney, Agent, or Firm*—Oblon, Spivak, McClelland, Maier & Neustadt, P.C.

[57] ABSTRACT

A pipe joint is provided wherein quick joints assembly are installable in two ports and in a fluid pressure apparatus such as a solenoid transfer valve as in the prior art, while joints with a female thread are interchangeable with the guide joints so as not to rotate even when male screw members for piping are screwed in. The quick joints and the joints with a female thread are interchangeably installed in a fluid pressure apparatus in which two ports are switched and supplied with a pressurized fluid. Although the quick joints and the joints with a female thread can be installed as in the prior art, the joints with a female thread are integrally connected and fixed between the quick joints and the joints with a female thread via a connection member so as not to rotate even when male screw members for piping are screwed in.

2 Claims, 3 Drawing Sheets

PIPE JOINT FOR FLUID PRESSURE APPARATUS

BACKGROUND OF THE INVENTION

1. Field of the Invention

The present invention relates to a pipe joint that connects pipes to two parallel ports such as output ports in a five-port solenoid transfer valve, and in particular to a pipe joint for a fluid pressure apparatus that enables even joints with a female screw to be simply installed in two parallel ports in which quick joints are normally installed.

2. Description of the Prior Art

In a generally known solenoid transfer valve, either quick joints or joints with a female thread are used to connect pipes to two output ports A and B, and several products including such an option are available on the market.

If several types of such products are available on the market that are actually the same except for such a pipe joint in this manner, the type and number of products stored during manufacturing and distribution increase. Furthermore, if other options are provided, such as selectability of the form or direction in which feeding lines are connected to a solenoid in a solenoid transfer valve, the type and number of products stored during manufacturing and distribution also significantly increase.

To deal with this problem, the quick joints and the joints with a female thread that are installed in the two parallel ports A and B are interchangeable. However, the quick joints must only be inserted into joint-insertion openings via a seal in ports and (rotatably) fixed so as not to slip out, but the joints with a female thread must be fixed so as not to rotate, enabling male screw members to be screwed into the female threads for piping. Thus, the joints with a female thread must include a means for preventing rotation, and therefore have a complicated structure, require a large number of parts, include many are complicated to assemble, and are high in cost.

SUMMARY OF THE INVENTION

It is a technical object of this invention to provide a pipe joint for a fluid pressure apparatus wherein, when quick joints and joints with a female thread are installed in joint-insertion openings in two ports in a fluid pressure apparatus such as a solenoid transfer valve as described above, the quick joints must be inserted only into the insertion openings via a seal and fixed so as not to slip out, as in conventional pipe joints, while the joints with a female thread can be fixed so as not to rotate even when male screw members for piping are screwed in.

It is another technical object of this invention to significantly simplify the structure of this pipe joint for a fluid pressure apparatus in order to lower its cost.

To achieve these objects, this invention provides a pipe joint for a fluid pressure apparatus in which quick joints and joints with a female thread used for piping are interchangeable in a fluid pressure apparatus in which two parallel ports are switched and supplied with a pressurized fluid, characterized in that the pipe joint has a means for locking that portion of the quick joint that is inserted into a joint-insertion opening in each of the ports via a seal so that the inserted portion of the joint will not slip out from the opening, in that the structure of that portion of the joint with a female thread that is inserted into each of the openings is substantially the same as in the quick joint, and in that the two joints with a female thread are integrally connected and fixed via a connection member.

According to the pipe joint for a fluid pressure apparatus, the means for locking that portion of the quick joint and the joint with a female thread that is inserted into the joint-insertion opening in the port so that the inserted portion of the joint will not slip out from the opening is desirably a means for fitting and locking in a locking recessed groove provided on the outer circumference of the inserted portion, leg portions of a U-shaped pin inserted into the fluid pressure apparatus through a body member. In addition, the fluid pressure apparatus is preferably a five-port solenoid transfer valve in which two ports are switched and supplied with a pressurized fluid.

According to the pipe joint of this configuration, quick joints can be installed in the respective joint-insertion openings in the pair of ports in the body member of the fluid pressure apparatus simply by inserting the inserted portions of the quick joints into the joint-insertion openings in the ports and fitting and locking in the locking recessed grooves circumferentially provided in the inserted portions the leg portions of the U-shaped pin inserted into the body member. This configuration allows the quick joints to be anchored in the joint-insertion openings in the body member so as not to slip out.

In this case, the quick joint may rotate within the insertion opening around its axis, but this does not affect pipe connections or other operations.

On the other hand, joints with a female thread can be installed in the respective joint-insertion openings in the pair of ports of the fluid pressure apparatus simply by inserting into the joint-insertion openings in the ports the inserted portions of the two joints with a female thread integrally connected together by the connection member, and fitting and locking in the locking recessed grooves circumferentially provided in the inserted portions the leg portions of the U-shaped pin inserted through the body member as in the quick joints. This configuration allows each joint with a female thread to be anchored in the joint-insertion opening in the body member so as not to slip out, and also allows the two joints with a female thread to be integrally connected and fixed via the connection member to prevent the joints from being rotated, even when male screw members for piping are screwed in.

Such quick joints and joints with a female thread can be interchangeably mounted directly using the quick-joint insertion openings in the body member. Furthermore, the joints with a female thread can be fixed so as not to rotate using a very simple means for integrating the two joints together. Thus, manufacturers need not individually provide a fluid pressure apparatus including quick joints or joints with a female thread, and can therefore supply inexpensive products.

DETAILED DESCRIPTION

Figure 1:
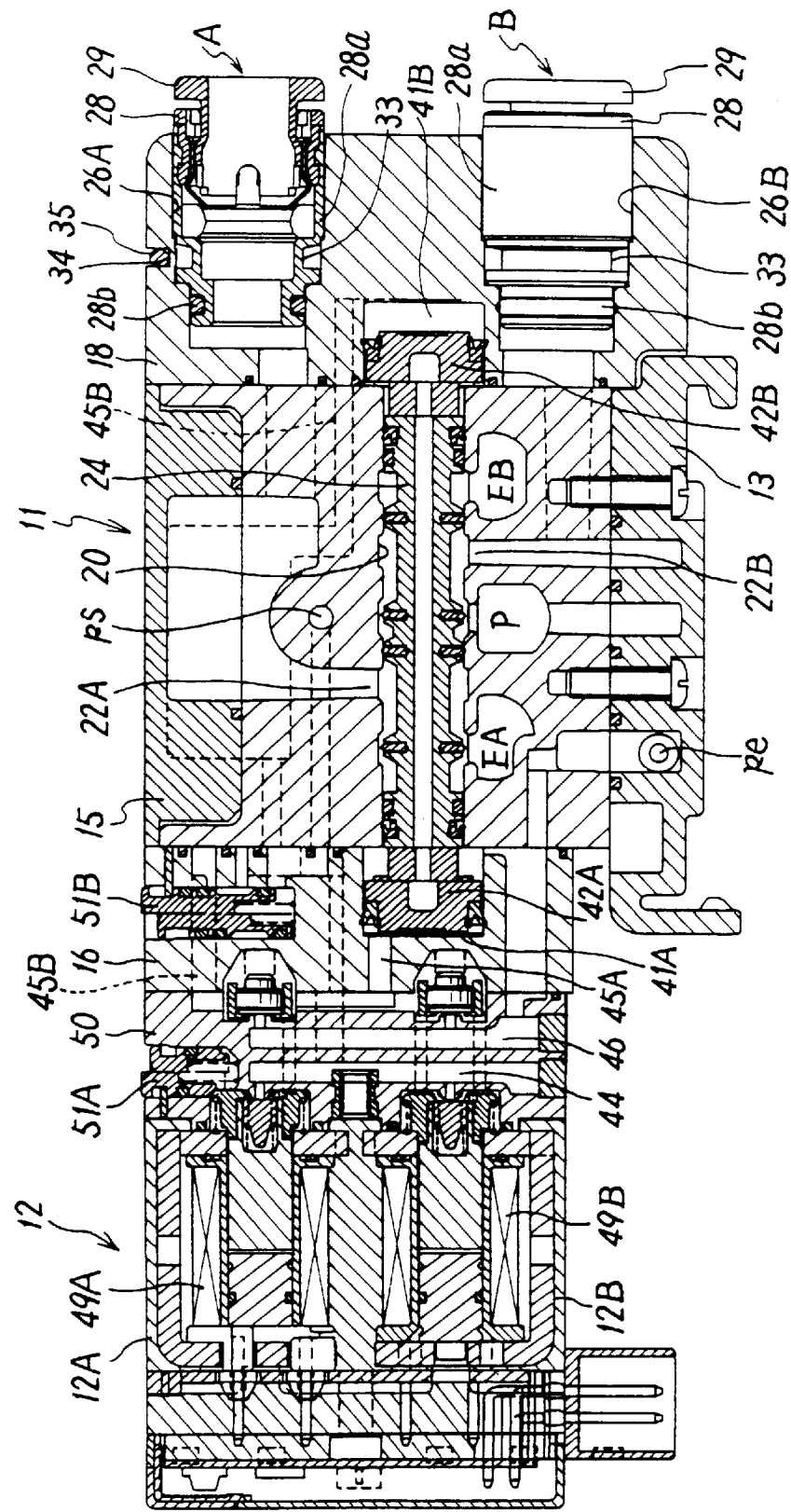
FIG. 1 is a sectional view of a solenoid transfer valve including a pipe joint according to this invention, with quick joints mounted in output ports.
Figure 3:
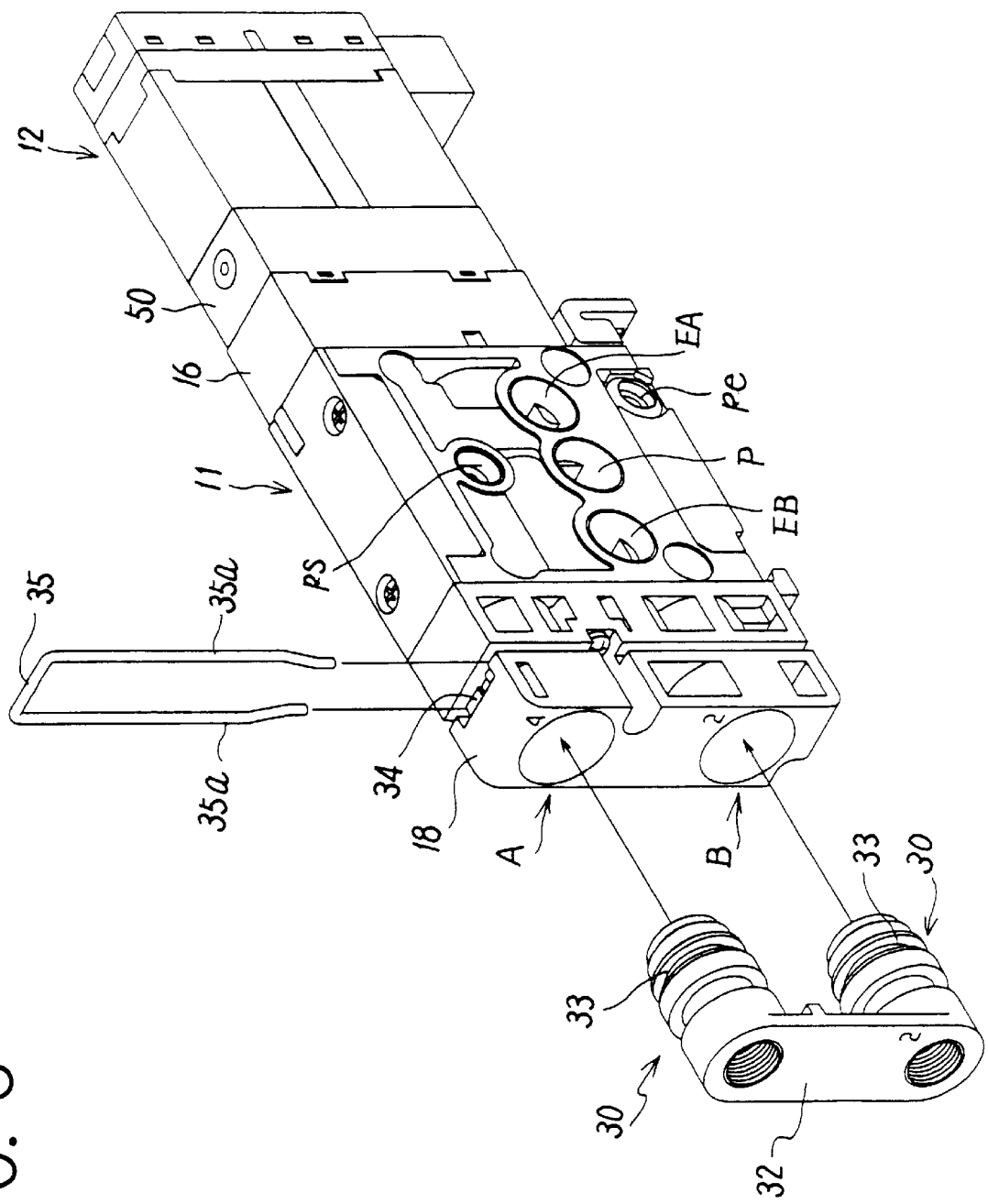
FIG. 3 is a partly exploded perspective view of the solenoid transfer valve shown in FIG. 2.

FIGS. 1 and 3 show embodiments of a solenoid transfer valve including a pipe joint according to this invention.

This transfer valve is configured as a five-port double-pilot transfer valve comprising a main valve 11 and a pilot-valve section 12 having two pilot solenoid valves 12A and 12B so that a large number of transfer valves can be connected together on DIN rails (not shown) using a bottom cover 13.

The main valve 11 comprises a valve body 15 on which the bottom cover 13 is mounted, a piston box 16 mounted on one of the end surface of the valve body 15, and an end plate 18 mounted on the other end surface of the valve body 15. The valve body 15 includes a compressed-air supply passage P, first and second ejection passages EA and EB, and a pilot supply passage ps that penetrates the valve body in the direction in which a plurality of valve bodies 15 are connected together and are in mutual communication due to the connection, and also includes a valve hole 20 that penetrates both end surfaces on which the piston box 16 and end plate 18 are mounted and that is in communication with the supply passage P and first and second ejection passages EA and Eb. First and second output openings 22A and 22B are opened between the supply passage P and ejection passages EA and EB, all of which are opened into the valve hole 20, and a valve body 24 is slidably inserted into the valve hole 20 to switch the first and second output openings 22A and 22B between the supply passage P and ejection passages EA and EB for communication.

Figure 2:
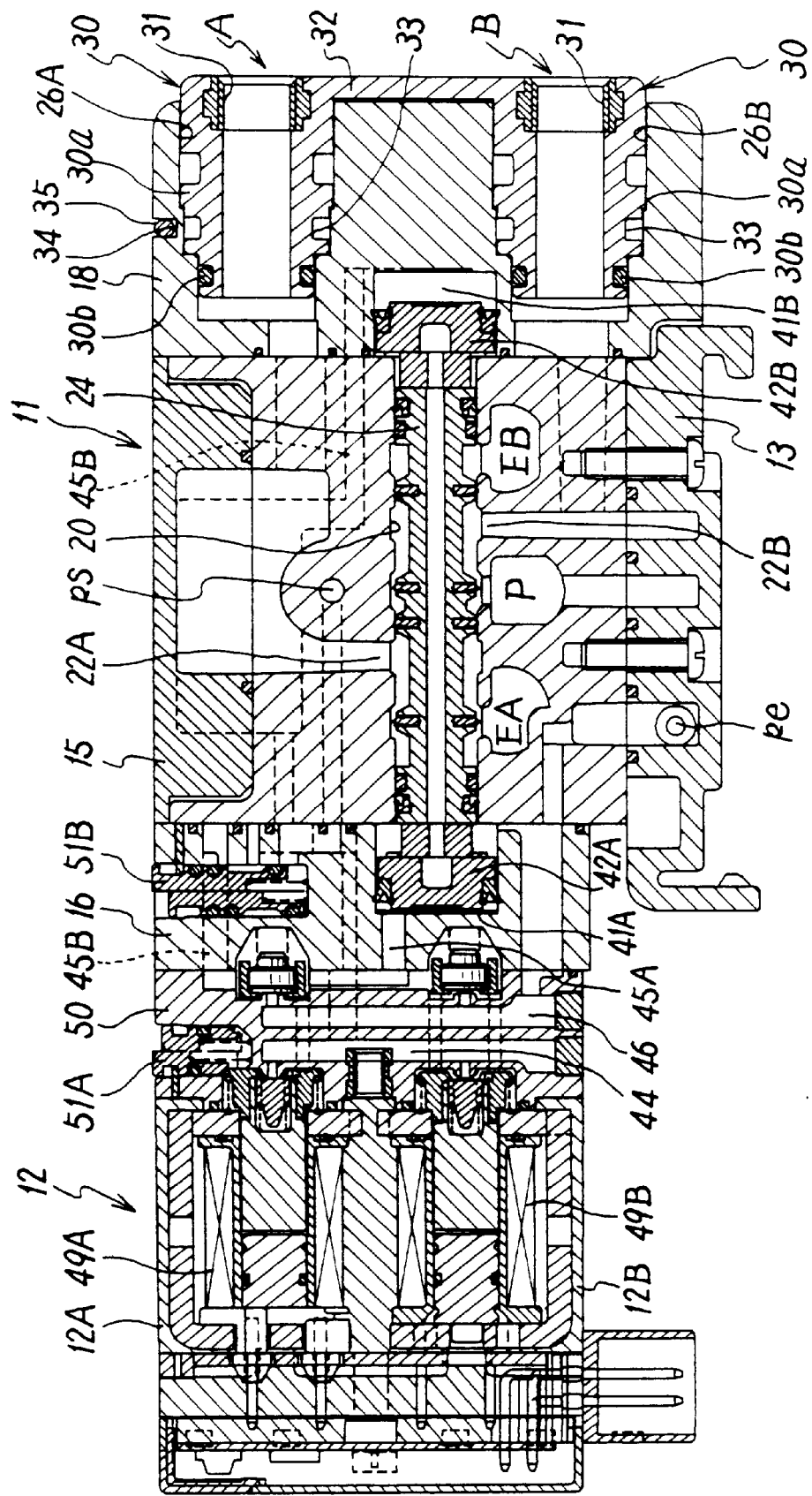
FIG. 2 is a sectional view in which joints with a female thread are mounted.

First and second output ports A and B are opened in the outer surface of the end plate 18 in such a way as to be positioned in parallel in the vertical direction, and are in communication with the first and second output openings 22A and 22B through passages formed in the valve body 15. In the transfer valve shown in FIG. 1, inserted portions 28a of quick joints 28 are installed in joint-insertion openings 26A and 26B in output ports A and B, respectively, via a seal 28b. FIGS. 2 and 3 show that inserted portions 30a of joints with a female thread 30 are installed in the joint-insertion openings 26A and 26B in the output ports A and B, via a seal 30b.

The quick joint 28 is of a well-known type in which, when a flexible tube for a pressurized fluid (not shown) is inserted, a claw is engaged with the tube, while when a release bush 29 is pressed the tube is disengaged and can be removed. The joint 30 with a female thread has a female thread 31 into which a male screw member for piping is screwed, and a pair of joints 30 that are installed in the two output ports A and B are integrally connected and fixed via a connection member 32.

To allow the quick joints 28 and the joints 30 with a female thread 31 to be installed in the joint-insertion openings 26A and 26B in the output ports A and B so as not to slip out, a locking recessed groove 33 is provided on the outer circumference of the inserted portion 28a and 30a of the quick joint 28 and the joint with a female thread 30. On the other hand, a mounting groove 34 is provided in the end plate 18 that is a body member of the fluid pressure apparatus in order to allow a pair of leg portions 35a (see FIG. 3) of an inserted U-shaped pin 35 to be fitted and locked in the recessed groove 33 so that the U-shaped pin 35 is inserted into the mounting groove 34 and locking recessed groove 33 to detachably mount the quick joints 28 and joints with a female thread 30 via the seals 28b and 30b.

The quick joints 28 may rotate within the joint insertion openings 26A and 26B around their axes, but this does not affect pipe connections or other operations.

On the other hand, the joints with a female thread 30 are locked so as not to slip out by inserting the U-shaped pin 35 into the locking recessed groove 33 through the mounting groove 34, as in the quick joints. Since, however, the two joints with a female thread 30 are integrally connected together via the connection member 32, they do not rotate even when male screw members for piping are screwed into the female threads.

A first piston 42A is slidably inserted into a first piston chamber 41A formed in the piston box 16 in an airtight manner, while a second piston 42B is slidably inserted into a second piston chamber 41B formed in the end plate 18 in an airtight manner. When pilot fluid is supplied to the first piston chamber 41A through a first pilot output passage 45A, the first piston 42A and valve disc 24 move rightward in the figure to allow the supply passage P, the first output opening 22A, and the second output opening 22B and the second ejection passage EB to mutually communicate, thereby causing a pressurized fluid to be output from the first output port A. In addition, when pilot fluid is supplied to the second piston chamber 41B through a second pilot output passage 45B, the second piston 42B and valve disc 24 move leftward in the figure to allow the supply passage P, the second output opening 22B, and the first output opening 22A and the first ejection passage EA to mutually communicate, thereby causing a pressurized fluid to be output from the second output port B.

The first and second pilot solenoid valves 12A and 12b in the pilot-valve section 12 are configured as well-known normally closed three-port solenoid valves comprising a pilot inlet passage 44, pilot output passages 45A and 45B, and a pilot exhaust passage 46 wherein solenoids 49A and 49B are energized and de-energized to switch the pilot output passages 45A and 45B between the pilot inlet passage 44 and pilot exhaust passage 46 for communication.

The pilot inlet passage 44 for the pilot solenoid valves 12A and 12B is in communication with the pilot supply passage ps through passages in the pilot valve body 50, piston box 16, and valve body 15. The pilot outlet passage in the solenoid valve 12A is in communication with the first piston chamber 41A through the first pilot output passage 45A, while the pilot outlet passage in the solenoid valve 12B is in communication with the second piston chamber 41B through the second pilot output passage 45B. The pilot exhaust passage 46 for the pilot solenoid valves 12A and 12B is in communication with the pilot ejection passage pe.

First and second manual operating devices 51A and 51B provided in the pilot valve body 50 and piston box 16 are constantly urged by a spring in the direction in which they protrude so that they can be pressed. When an accident such as service interruption prevents the valve disc 24 from being driven by the solenoids 49A and 49B, the operating devices are pressed to allow the pilot supply passage ps to communicate with the pilot output passages 45A and 45B in order to drive the valve disc 24.

Although the use in a five-port solenoid valve of the pipe joint according to this invention has been described, the pipe joint can be applied to various fluid pressure apparatuses in which two parallel ports are switched and supplied with a pressurized fluid.

According to the pipe joint for a fluid pressure apparatus described above, when the quick joints and the joints with a female thread are interchangeably installed as pipe joints in the joint-insertion openings in the two ports in a fluid pressure apparatus such as a solenoid transfer valve, the quick joints can be inserted into the insertion openings via the seal and fixed so as not to slip out, and the joints with a female thread can be fixed so as not to rotate even when male screw members for piping are screwed in. Furthermore, the structure of this pipe joint for a fluid pressure apparatus can be significantly simplified to enable it to be sold at a low price.

What is claimed is:

1. A pipe joint assembly, comprising:

a fluid pressure apparatus which has two parallel ports; two quick joints and two joints with a female thread for pipe connection wherein said quick joints and said joints with a female thread are interchangeably installed in the ports, wherein:

each of said ports has a joint-insertion opening for inserting an insertable portion of said joints and a common U-shaped pin positioned for locking the insertable portions in the insertion opening, wherein:

the insertable portions of the quick joints and the joints with a female thread have substantially the same configuration so as to interchangeably insertable into the insertion opening, the insertable portions having a seal and a recessed groove for said U-shaped pin to be fitted and locked thereto; and a connection member for integrally connecting the two joints with a female thread upon being inserted into the ports.

2. A pipe joint assembly for a fluid pressure apparatus according to claim 1, which comprises a five-port solenoid valve wherein the fluid pressure apparatus in which two parallel ports are interchangeable and are supplied with a pressurized fluid by said five-port solenoid valve.

* * * * *